US006523408B1

(12) United States Patent
Colarelli, III et al.

(10) Patent No.: US 6,523,408 B1
(45) Date of Patent: Feb. 25, 2003

(54) WHEEL BALANCER SYSTEM WITH IMPROVED MATCHING CAPABILITIES

(75) Inventors: Nicholas J. Colarelli, III, Creve Coeur, MO (US); Michael W. Douglas, St. Peters, MO (US); Paul Daniel Parker, Kirkwood, MO (US); David M. Scribner, St. Charles, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/626,949

(22) Filed: Jul. 27, 2000

(51) Int. Cl.$^7$ ................................................. G01M 1/16
(52) U.S. Cl. ........................................................ 73/460
(58) Field of Search ........................... 73/460, 461, 462

(56) References Cited

U.S. PATENT DOCUMENTS

| | | | |
|---|---|---|---|
| 3,630,077 A | 12/1971 | Boileau | 73/146 |
| 4,139,041 A | 2/1979 | Newton | 157/13 |
| 4,244,416 A | 1/1981 | Newton | 157/13 |
| 5,105,595 A | 4/1992 | Tokei et al. | 52/381 |
| 5,447,064 A * | 9/1995 | Drechsler et al. | 73/462 |
| 5,526,686 A * | 6/1996 | Fuchs et al. | 73/462 |
| 5,587,528 A * | 12/1996 | Rothamel et al. | 73/462 |
| 5,739,428 A | 4/1998 | Bux et al. | 73/146 |
| 5,915,274 A * | 6/1999 | Douglas | 73/462 |
| 5,959,204 A * | 9/1999 | Rothamel et al. | 73/462 |
| 6,244,108 B1 * | 6/2001 | McInnes et al. | 73/462 |

FOREIGN PATENT DOCUMENTS

WO   WO 88/03866   6/1988

* cited by examiner

*Primary Examiner*—Richard A. Moller
(74) *Attorney, Agent, or Firm*—Thompson Coburn LLP; Gregory E. Upchurch

(57) ABSTRACT

Matching multiple wheel rims and tires based upon runout and force variation measurements using balancing equipment. Centering errors and mounting errors are also reduced or eliminated. The method includes adjusting the rotational positions of the tires with respect to the wheel rims to compensate for wheel rim run-out and wheel/tire assembly force variations. This is accomplished in one embodiment by sequentially mounting a plurality of wheel/tire assemblies on a spindle of a balancer, measuring the rim run-out for each assembly and the force variations for each assembly, marking each tire of each assembly to identify both the individual tire and the rotational position representing the first harmonic of the tire force variation at which each tire is mounted with respect to its wheel rim, removing each tire from its wheel rim, sequentially mounting the wheel rims with tires removed on the spindle of the balancer, measuring the rim run-out for each rim, and visually indicating to a user a preferred matching between the tires and the wheel rims to minimize assembly vibration.

49 Claims, 9 Drawing Sheets

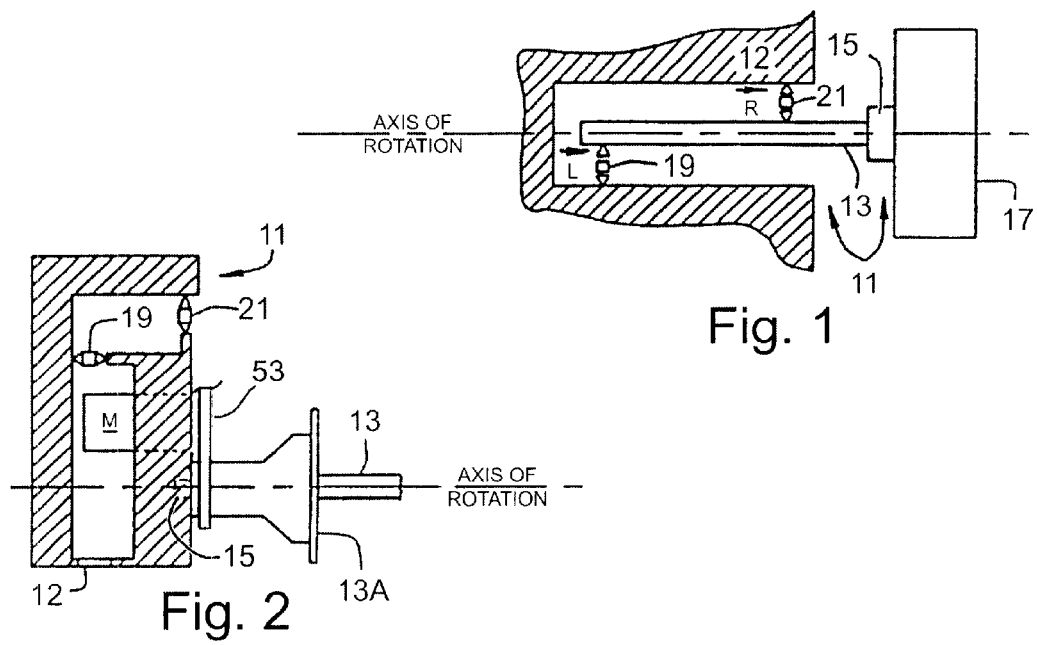
Fig. 1
Fig. 2
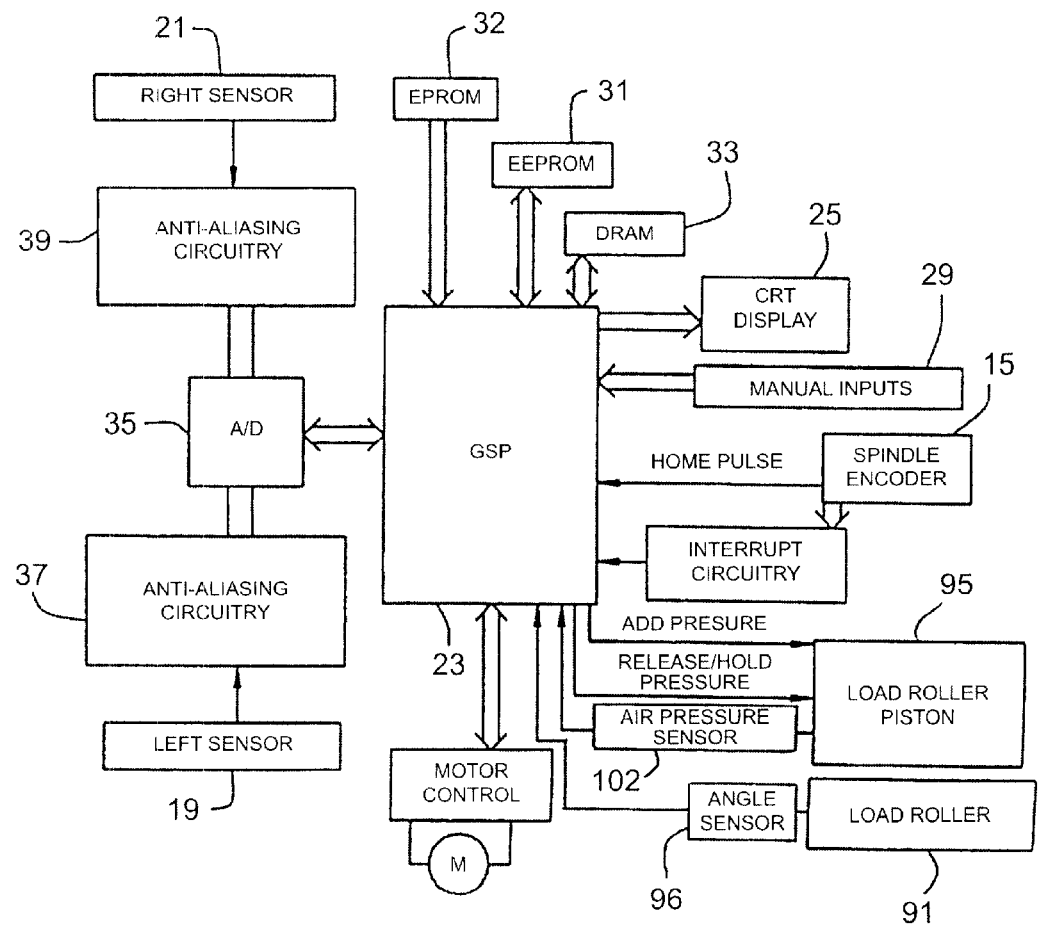
Fig. 3

WHEEL BALANCER SYSTEM WITH IMPROVED MATCHING CAPABILITIES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to automotive service wheel balancers with the capability of measuring tire uniformity and in particular to an improved system for matching and cross-matching multiple tires with multiple wheel rims.

2. Description of the Prior Art

Wheel balancers determine unbalance in vehicle wheel/tire assemblies by an analysis of the mechanical vibrations caused by rotating the wheel/tire assembly. The mechanical vibrations are measured as motions, forces, or pressures by means of transducers, which convert the mechanical vibrations to electrical signals. Wheel/tire assembly unbalance may result from unbalance in the wheel, unbalance in the tire, or both.

Even when a wheel/tire assembly is balanced, non-uniformity in the construction of the tire as well as runout in the wheel rim can cause significant vibration forces as the wheel rolls under vehicle load. Most tire manufacturers inspect their tires on tire uniformity machines and grind rubber off the tires as required to improve rolling characteristics of the tires. Even after this procedure, tires will often produce vibration forces (not related to imbalance) of 20 pounds as they roll on a smooth road.

SAE recommended practice J332 describes testing machines for measuring the uniformity of passenger car and light truck tires. Machines conforming to J332 are used by tire manufacturers, but they are large and expensive and not affordable for automotive service use.

Only a few models of machines capable of measuring tire uniformity have been offered to the automotive service industry. One such machine was the Tire Matcher System 6000 ™ which was manufactured by Ride Control Systems Inc. in the 1980s. This machine measured the radial force variation and then buffed the tire in selected areas to bring the radial force variation within acceptable limits. This machine did not match the wheel to the tire and did not balance the wheel/tire assembly. The Dynabal Corporation manufactured a wheel balancer in the early 1990s which had the capability to measure the radial force variation of a wheel/tire assembly and the wheel rim runout. This machine displayed the angular location to mount the tire onto the wheel to minimize the wheel/tire assembly radial force variation. The GSP9700 manufactured by Hunter Engineering is another balancer which measures wheel/tire assembly radial force variation and rim runouts. This balancer also will display the angular location to mount the tire onto the rim to minimize the wheel/tire assembly radial force variation. The above machines do not show the user how to take a set of two or more wheel/tires assemblies and cross match the tires and wheels to come up with the best pairing of wheels to tires.

Prior art balancers also have more subtle deficiencies that arise in connection with compensating for run-out and in tire matching. For example, wheel rim runout is frequently measured from the "outside" of the rim (i.e., that portion of the wheel rim that is exposed to view once the tire is mounted thereon. If the wheel rim runout measured on the "outside" portion of the rim does not correspond to the runout of the bead seat surface itself (which is on the "inside"), errors in the tire matching/compensation process can be introduced.

Even if the actual bead seat is used to measure runout, errors can still result. For example, if the bead seat method is used to obtain runout, the rim must be removed from the balancer for mounting the tire and then remounted to the balancer to measure wheel/tire assembly force variations. Any centering difference with respect to the spindle of the balancer will result in errors in the determination of the rim runout, the assembly force variation, and the tire force variation computation. This "centering error" can become even more significant with larger wheel/tire assemblies.

Similarly, with conventional equipment, after mounting the tire on the rim the rim must be mounted at exactly the same angular position relative to the spindle as it was mounted in the rim runout measurement step. Otherwise the angle of the recalled rim contribution will be incorrect and so will the resulting tire computation.

Some of the deficiencies of prior art balancers are addressed by co-assigned U.S. application 09/311,473, which is incorporated herein by reference.

SUMMARY OF THE INVENTION

Among the various objects and features of the present invention is a wheel balancer for use in tire matching which has improved performance.

Another object is the provision of such a wheel balancer that facilitates the matching of a tire and rim to reduce vibration.

A third object is the provision of such a wheel balancer that measures rim and tire runout more accurately than current balancers.

A fourth object is the provision of such a wheel balancer that readily detects centering errors resulting from the improper remounting of a wheel or a wheel/tire assembly on the balancer.

A fifth object is the provision of such a wheel balancer that prevents errors resulting from the rotational angle at which a rim is remounted on the balancer.

A sixth object is the provision of such a wheel balancer with improved vibration reduction in the balanced wheel/tire assembly.

A seventh object is the provision of such a wheel balancer with improved tire rejection rates.

Other objects and features will be in part apparent and in part pointed out hereinafter.

Briefly, in a first aspect of the present invention a method of matching a tire to a wheel includes the steps of mounting the bare wheel on a spindle of a wheel balancer, providing to the balancer a signal indicative of the relative rotational position of the wheel with respect to the spindle, determining the run-out of the wheel rim, mounting a wheel/tire assembly on the balancer spindle, the wheel/tire assembly consisting of the tire mounted on the wheel, determining force variation of the wheel/tire assembly, visually indicating a relative rotational mounting position of the tire with respect to the wheel to minimize the wheel/tire assembly force variation, repeating the previous steps with at least one additional wheel and wheel/tire assembly, and matching the tires with the wheels so as to minimize force variation for the wheel/tire assemblies as a group.

In a second aspect of the present invention, a method of matching a tire to a wheel includes the steps of mounting the bare wheel on a spindle of a wheel balancer, providing to the balancer a signal indicative of the relative rotational position of the wheel with respect to the spindle, determining the run-out of the wheel, mounting a wheel/tire assembly on the balancer spindle, the wheel/tire assembly consisting of the tire mounted on the wheel, providing to the balancer a signal indicative of the relative rotational position of the wheel/tire assembly with respect to the spindle, determining force variation of the wheel/tire assembly, and visually indicating a relative rotational mounting position of the tire with respect to the wheel to minimize the wheel/tire assembly force variation.

In a third aspect of the present invention, a method of matching a tire to a wheel by adjusting the rotational positions of the tire with respect to the wheel to compensate for wheel rim run-out and force variations includes the steps of measuring rim run-out from the exterior of the wheel to obtain a first rim run-out measurement, measuring rim run-out from the bead seat to obtain a second rim run-out measurement, and compensating the force variation measurement for differences in the first and second rim run-out measurements.

In a fourth aspect of the present invention, a method of balancing a wheel/tire assembly consisting of a wheel and a tire includes the steps of mounting the wheel on a spindle of a balancer, measuring rim run-out from the exterior of the wheel rim without a tire mounted thereon to obtain a first exterior rim run-out measurement, mounting a tire on the wheel rim to form a wheel/tire assembly, mounting the wheel/tire assembly on the spindle of the balancer, measuring rim run-out from the exterior of the wheel with a tire mounted thereon to obtain a second exterior rim run-out measurement, and remounting the wheel/tire assembly on the balancer if the rim run-out measurements differ by an amount indicating that the wheel was not centered properly on the spindle during one of the rim run-out measurements.

In a fifth aspect of the present invention, a method of matching tires to wheels by adjusting the rotational positions of the tires with respect to the wheels to compensate for wheel run-out and wheel/tire assembly force variations includes the steps of sequentially mounting a plurality of wheel/tire assemblies on a spindle of a balancer, measuring the rim run-out for each assembly and the force variations for each assembly, marking each tire of each assembly to identify both the individual tire and the rotational position representing the first harmonic of the tire force variation at which each tire is mounted with respect to its wheel, removing each tire from its wheel, sequentially mounting the wheels with tires removed on the spindle of the balancer, measuring the rim run-out for each rim, and visually indicating to a user a preferred matching between the tires and the wheels to minimize assembly vibration.

In a sixth aspect of the present invention, a method of matching tires to wheels includes the steps of mounting a bare wheel to a spindle of a wheel balancer, measuring run-out of the wheel rim, visually identifying the wheel whose run-out has been measured, mounting a tire on the wheel to form a wheel/tire assembly, mounting the wheel/tire assembly to the spindle, measuring the force variation of the wheel/tire assembly as it is spun on the balancer, compensating the measured force variation for the force variation due to wheel run-out to determine force variation of the tire, visually indicating to the user proposed matching locations on the tire and the wheel, manually marking the proposed matching locations on the tire and the wheel, repeating the previous steps for any additional wheels and tires as desired to create a set of tires and wheels with proposed matching locations marked thereon, automatically determining the best combinations between the tires and wheels that have been marked to reduce vibration, and mounting the tires on the wheels in the automatically determined best combinations.

In a seventh aspect of the present invention, an apparatus for matching tires to wheels includes a balancer having a spindle on which wheels and wheel/tire assemblies may be mounted for determining force variations and wheel rim runout. The balancer further includes a computer programmed to predict force variation for a given tire mounted on a plurality of wheels, said wheels having known run-out characteristics.

In an eighth aspect of the present invention, an apparatus for matching tires to wheels includes a balancer having a spindle on which wheels and wheel/tire assemblies may be mounted for determining force variations and wheel rim runout, and a computer programmed to predict force variation for a given wheel having mounted thereon a plurality of tires, said tires having known force variation characteristics.

In a ninth aspect of the present invention, a method of matching tires to wheels includes the steps of mounting a bare wheel to a spindle of a wheel balancer, measuring run-out of the wheel rim, visually identifying the wheel whose run-out has been measured, mounting a tire on the wheel to form a wheel/tire assembly, mounting the wheel/tire assembly to the spindle, measuring the force variation of the wheel/tire assembly as it is spun on the balancer, compensating the measured force variation for the force variation due to wheel rim run-out to determine force variation of the tire, visually indicating to the user proposed matching locations on the tire and the wheel, manually marking the proposed matching locations on the tire and the rim, repeating the previous steps for any additional wheels and tires as desired to create a set of tires and wheels with proposed matching locations marked thereon, automatically determining the best combinations between the tires and wheels that have been marked to reduce vibration, and repeating the prior steps until at least four sets of tires and wheels are matched, further including a visual indication to the user of the positions on the vehicle at which each of said four sets of tires and wheels should be mounted, and a visual indication to the user of the rotational position at which each tire should be mounted with respect to its matched wheel.

BRIEF DESCRIPTION OF THE DRAWINGS

FIG. 1 is a diagrammatic view illustrating a generic wheel balancer suitable for use with the present invention;

FIG. 2 is a simplified top plan view illustrating a wheel balancer used in connection with the present invention;

FIGS. 3 and 3A are block diagram illustrating various parts of the wheel balancer of FIG. 1 or FIG. 2.

Similar reference characters indicate similar parts throughout the several views of the drawings.

DESCRIPTION OF THE PREFERRED EMBODIMENTS

Turning to the drawings, FIG. 1 illustrates (in simplified form) the mechanical aspects of a wheel balancer 11 suitable for the present invention. The particular balancer shown is illustrative only, since the particular devices and structures used to obtain imbalance and runout information could readily be changed without changing the present invention.

Figure 3A:
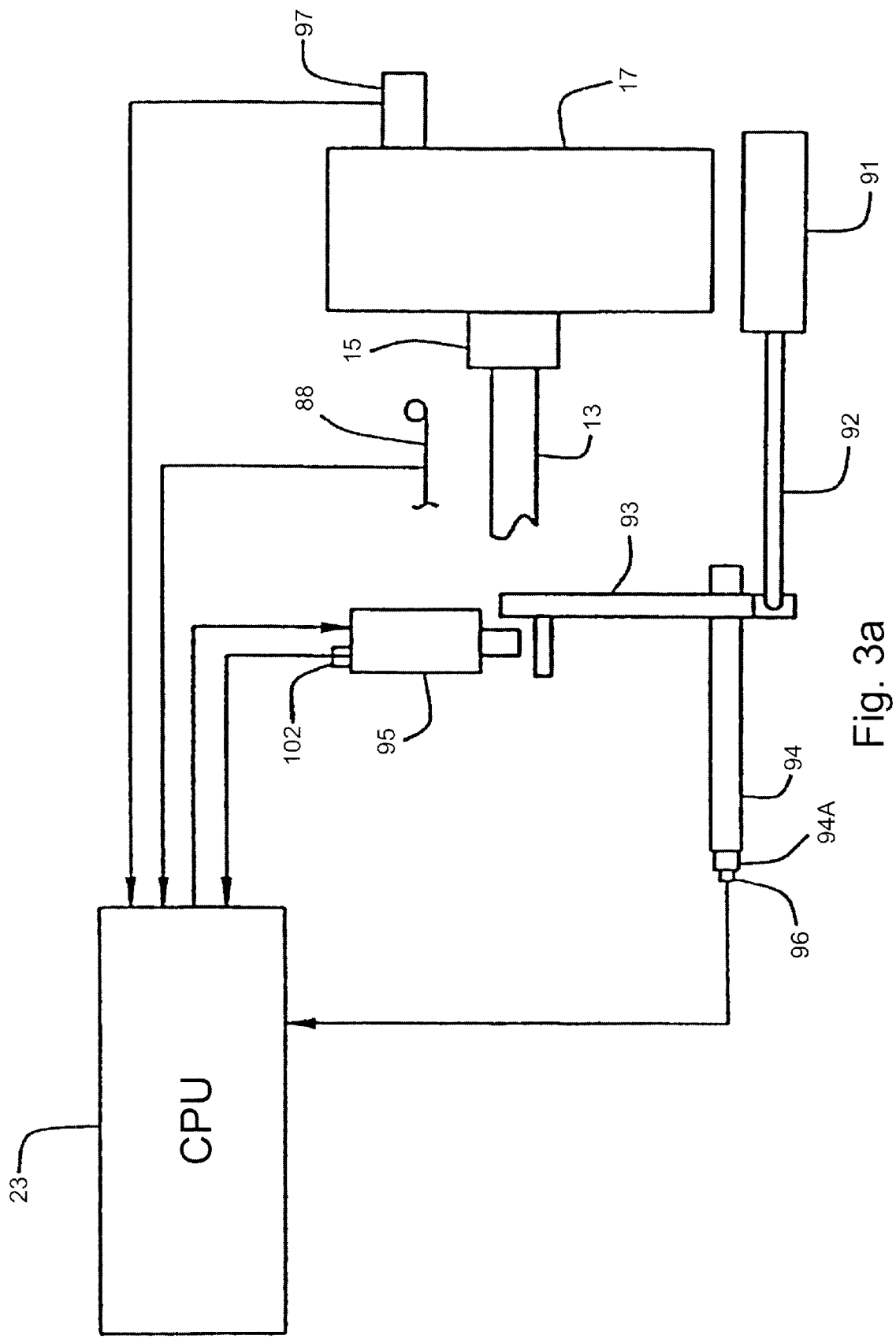

Balancer 11 includes a rotatable shaft or spindle 13 driven by a suitable drive mechanism such as a motor M and drive belt 53 (FIG. 2). Mounted on spindle 13 is a conventional quadrature phase optical shaft encoder 15 which provides speed and rotational position information to the circuitry of FIG. 3.

During the operation of wheel balancing, at the end of spindle 13, a wheel/tire assembly 17 under test is removably mounted for rotation with spindle hub 13A (FIG. 2). To determine wheel/tire assembly imbalance, the balancer includes at least a pair of piezoelectric type imbalance force sensors 19 and 21 (or other suitable sensors such as strain gauges) coupled to spindle 13 and mounted on the balancer base 12. For ease of reference herein, sensor 19 is referred to as the "L" (Left) sensor and sensor 21 is referred to as the "R" (Right) sensor.

Turning to FIG. 2, it can be seen that the actual construction of the mechanical aspects of balancer 11 can take a variety of forms. For example, spindle 13 can include a hub 13A against which wheel/tire assembly 17 abuts during the balancing procedure.

When wheel/tire assembly 17 is unbalanced, it vibrates in a periodic manner as it is rotated, and these vibrations are transmitted to spindle 13. The "L" and "R" sensors are responsive to these vibrations of the spindle. Specifically, they generate a pair of analog electrical signals corresponding in phase and magnitude to the vibrations of the spindle at the particular transducer locations. These analog signals are input to the circuitry of FIG. 3, described below, which determines the required magnitudes and positions of correction weights to correct the imbalance.

Turning to FIG. 3, wheel balancer 11 includes not only the "L" and "R" sensors, and spindle encoder 15, but also a computer or CPU 23 (such as the graphic signal processing (GSP) chip 23 shown). GSP chip 23 performs signal processing on the output signals from the "L" and "R" sensors to determine wheel imbalance. In addition it is connected to and controls a display 25 which provides information to the user, controls motor M through motor control circuitry 27, and keeps track of the spindle position from encoder 15. More specifically, encoder 15 is a 128 count, two channel quadrature encoder which is fully decoded to 512 counts per wheel revolution by GSP chip 23. Although GSP chip 23 is shown, it should be understood that other controller circuitry could be used as well.

Balancer 11 also includes manual inputs 29 (such as a keyboard and parameter input data dials) which are also connected to GSP chip 23. Chip 23 has sufficient capacity to control via software all the operations of the balancer in addition to controlling the display. The GSP chip is connected to memory such as EEPROM memory 31, EPROM program memory 32, and dynamic RAM (DRAM) memory 33. The EEPROM memory is used to store non-volatile information, such as calibration data, while the GSP chip uses DRAM 33 for storing temporary data.

GSP chip 23 is also connected to an ADC 35. The signals from the "L" and "R" sensors 19 and 21 are supplied through anti-aliasing circuitry 37, 39 (if needed) to ADC 35.

The operation of the various components described above is fully described in U.S. Pat. No. 5,365,786 and 5,396,436, the disclosures of which are incorporated herein by reference. It should be understood that the above description is included for completeness only, and that various other circuits could be used instead. The GSP chip could be replaced by a general purpose microcontroller, for example, with no loss of efficiency in carrying out the present invention.

Figure 3B:
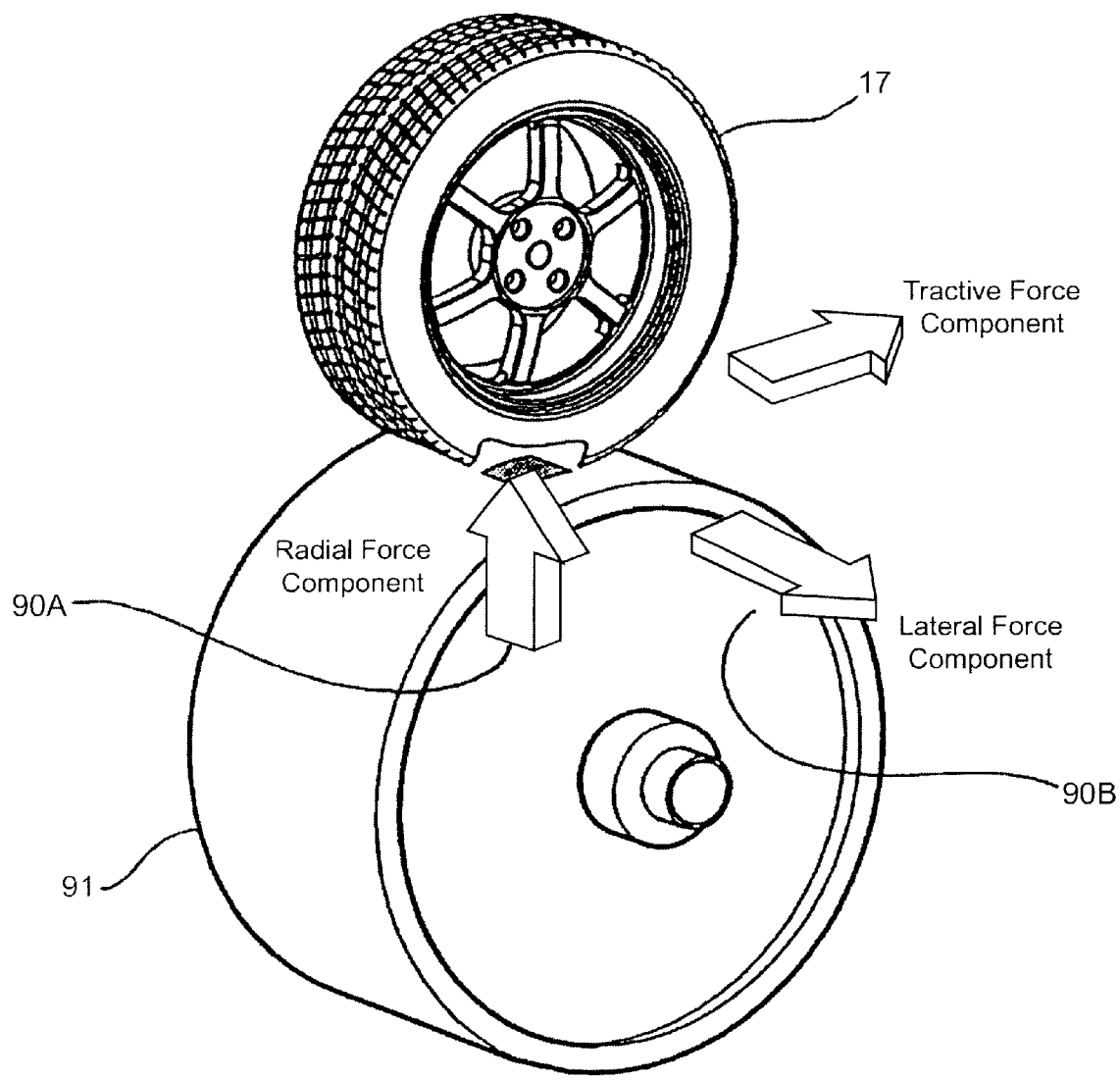
FIG. 3B is a graphic illustration of the contact forces imparted by the wheel balancer.

To understand the improvements of the present invention, it is helpful to examine some terms. FIG. 3B shows tire 17 with a load roller 91 pressing against it, along with the three contact forces which are defined as radial 90A, lateral 90B and tractive 90C. Tire uniformity is a term which refers to a condition in which some property of a tire is not symmetric about its rotational axis. There are many uniformity parameters which can be quantified.

Radial force variation is the change in force in the radial direction between a wheel/tire assembly 17 and a load roller 91 when the distance between the axis of the wheel/tire assembly and the load roller is held fixed. The average load between the wheel/tire assembly and the load roller, and the tire air pressure must be held to specified values. Loaded radial runout is the change in distance between wheel/tire 17 assembly and the load roller 91 when the load between the wheel/tire assembly and the load roller is held at a constant specified value and the distance between them is allowed to vary.

Radial force variation or loaded radial runout can be expressed in a variety of ways. Radial force variation can be expressed as a graph of force vs. location around the circumference of the tire. Another way would be the maximum force minus the minimum force. The root mean square value of force over the circumference is another method. It can also be expressed as the first harmonic value of radial force variation. This method which is widely used in industry uses the well know mathematical operation of a Fourier transform. The first harmonic value is the once per revolution component of the Fourier transform of the force vs circumferential location. This first harmonic value is essentially the sine wave of a once per revolution period which most closely matches the force vs circumferential location graph.

A value for the tire stiffness is required to convert wheel rim runout into radial force variation due to wheel rim runout: (wheel rim runout)(tire stiffness)=radial force variation due to wheel rim runout. Loaded radial runout of the wheel tire assembly can also be converted to a force variation value by using the tire stiffness or it can be measured directly. By subtracting the wheel force variation from the wheel/tire assembly force variation, the tire force variation can be obtained. By shifting the angle of the tire force variation relative to the wheel force variation, the wheel/tire assembly force variation can be computed at many remount angles of tire to wheel. Selecting the remount angle with the lowest wheel/tire assembly radial force variation is then possible.

Since radial force variation and loaded runout are directly linked as shown above it is understood that a method of matching a set of wheels to tires using loaded runout measurements is equivalent to the same method of matching but using radial force variation measurements.

The first harmonic of radial force variation is believed to be the best uniformity parameter to use to minimize wheel vibration because it also helps minimize the first harmonic tractive force variation.

Turning back to FIG. 3A, there is shown load roller 91 suitably disposed adjacent wheel/tire assembly 17 so that it may be forced into engagement with the tire so as to measure loaded runout of the assembly. More specifically, load roller 91 is carried on a shaft 92 suitably journaled on an L-shaped arm 93 designed to pivot about the axis of a shaft 94. CPU 23 causes the arm to pivot to place load roller into engagement with the tire by actuating an air cylinder 95 or an air bag actuator. Air pressure to cylinder 95 can be variably adjusted by CPU control. Air pressure feedback is provided by a sensor 102 such as those sold under the trade designation MPX 5700D by Motorola Inc. The feedback enables precise load roller forces to be generated and provides a unique safety feature in that the CPU can detect pressure problems and remove air pressure if needed. Rotation of shaft 94 (specifically rotation of a magnet 94A mounted on shaft 94) is sensed by a sensor 96 such as a Hall-effect sensor such as those sold under the trade designation 3506, 3507 or 3508 by Allegro Microsystems Inc. and the amount of rotation is signaled to the CPU.

By applying a known force to the tire with the load roller and watching the output of sensor 96, the CPU can determine the loaded runout of the wheel/tire assembly. CPU 23 uses the output of sensor 96 to measure the runout of wheel/tire assembly 17 under the predetermined load.

In addition, CPU 23 is preferably connected to suitable sensors 88 and 97 for measuring the axial and radial runout of the inside and outside wheel rims of assembly 17 at the bead seats. Various sensors suitable for the task are known. These outputs are radial and axial wheel rim runout signals. The first harmonic of radial wheel rim runout (both angle and magnitude) is determined by CPU 23 using a suitable procedure such as digital filtering or discrete Fourier transform (DFT). The same process can be performed to determine axial runout for each wheel rim. With both tire and wheel rim roundness measurements, CPU 23 is able to compare the measured values with stored wheel rim and tire runout specifications. When those specifications are not met, one can calculate a remounted orientation of the tire on the wheel rim that minimizes the total loaded runout. CPU 23 causes the display of such an orientation on display 25, along with the residual loaded runout which would remain after remounting. Alternatively, this information may be used to calculate the positions and amounts of required tire grinding to correct the loaded runout.

Figure 4:
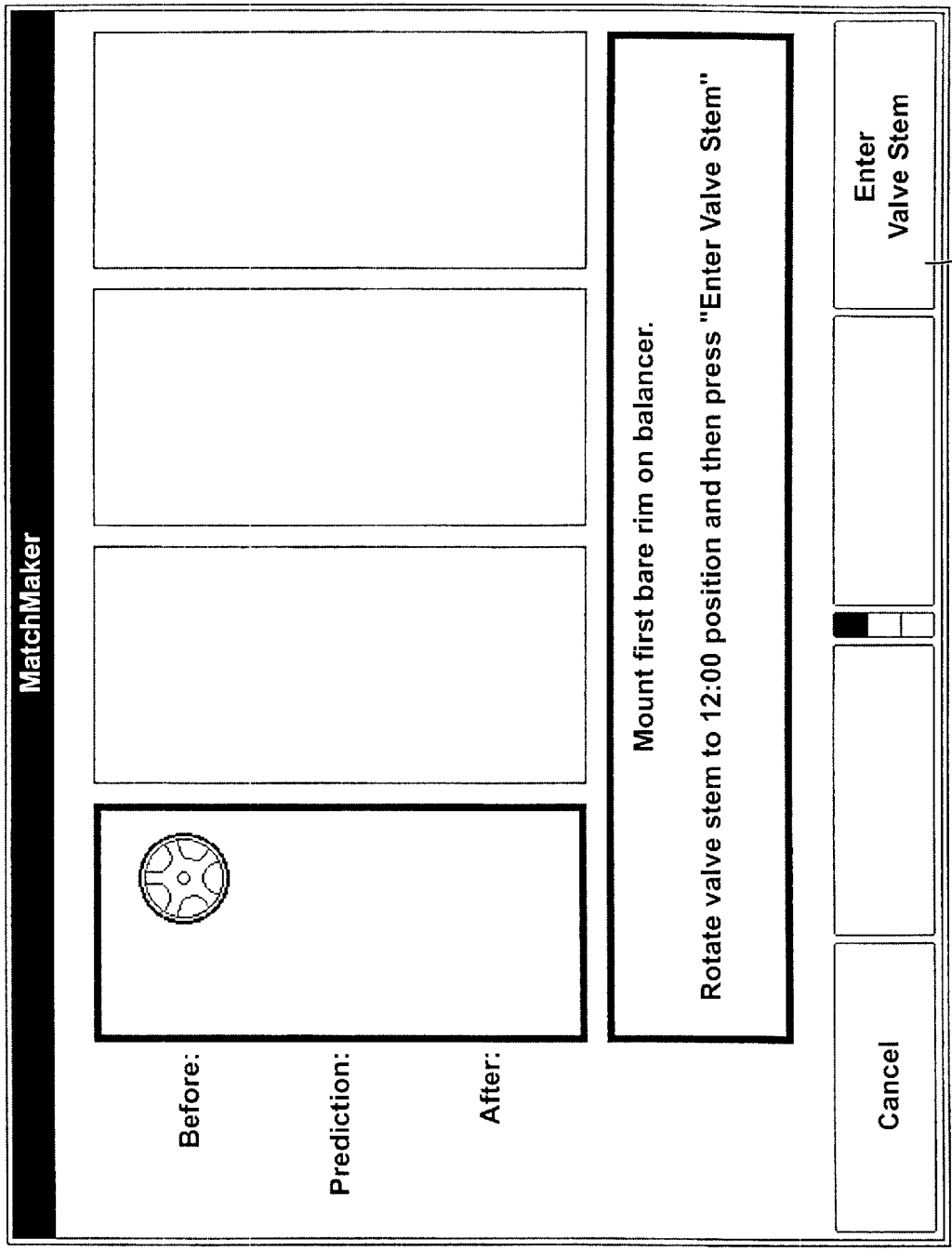
FIGS. 4–8 show various computer display screens for guiding a user through a procedure of this invention.

Runout arms 88 and 97, discussed above, may be advantageously used in improved tire matching and balancing. In this regard, the user signals to the CPU 23 the number of wheel/tire assemblies to be processed. Such a value can readily be provided to the CPU by an interactive screen display (not shown) in a conventional manner. Examples of typical numbers of wheel/tire assemblies are four (typical), five (four plus a spare), six ("duallies"—dual assemblies on the rear), etc. After selecting the desired number of wheel/tire assemblies, the user is directed by a screen, such as that shown in FIG. 4, to mount a bare wheel on the spindle 13 of the balancer and to rotate the wheel so that the valve stem is disposed at the 12:00 position. The screen also directs the user to press a soft key 201 labeled "enter valve stem" when the valve stem reaches the 12:00 position. Pressing the soft key provides the CPU with the angular rotational position of the mounted wheel with respect to the spindle, which information is used in later steps where the wheel is re-mounted on the balancer. Using wheel rim runout measuring arm 88, the user then measures the "outside" wheel rim runout at the left rim lip. ("Left" in this context means that side of the rim which faces the vehicle when mounted on the vehicle and which faces the balancer during balancing. "Outside" has the meaning set forth above, namely that portion of the rim that will not be obscured by the tire once the tire is mounted thereon.)

Next, the user may optionally provide a centering check. This centering check is performed by loosening wing nut 101, rotating the wheel with respect to the spindle (preferably 180 degrees), and retightening the wing nut. The wheel is again rotated until the valve stem reaches the 12:00 position, at which point the user again presses the "enter valve stem" soft key 201 (which provides CPU 23 with the new angular position). Wheel rim runout measurement arm 88 is again used to measure the "outside" rim runout at the left rim lip. If the new measurement differs from the previous measurement by more than a preset amount (a predetermined threshold), the CPU causes a screen to be displayed which warns of the detected miscentering. If miscentering is detected, it is preferred that the procedure be restarted.

Figure 4A:
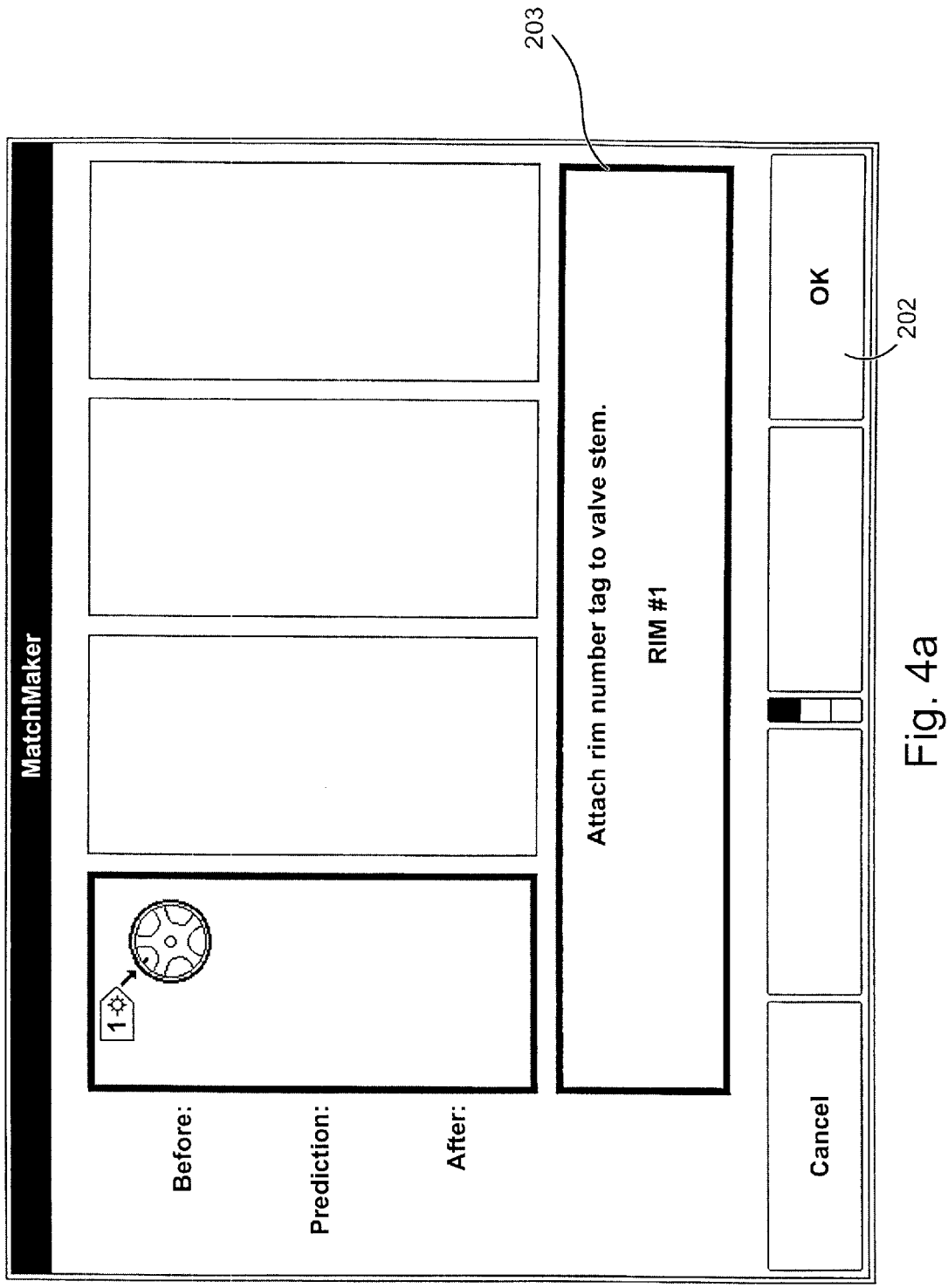

Next the wheel rim runout is measured at the bead seats using rim runout measuring arm 97. The CPU then causes the display of a screen, such as that shown in FIG. 4A, instructing the user to identify the wheel as wheel #1 by attaching a tag labelled "#1" to the valve stem of the first wheel and then to press soft key 202 labeled "OK". The screen provides a message 203 which provides directions, "Attach rim number tag to valve stem. RIM #1". At this point, wheel #1 is removed from the balancer and a tire is mounted thereon using a tire changer (not shown).

Once a tire is mounted to the wheel, the wheel/tire assembly is then mounted to the balancer, the user rotates the assembly until the valve stem reaches the 12:00 position, and then enters that fact via soft key 203. This act allows the CPU to determine the rotational position of the wheel/tire assembly with respect to the spindle.

At this point it is preferred that the "outside" wheel rim runout be measured at the left rim lip by wheel rim runout measurement arm 88. If this measurement reveals a centering problem, the CPU so instructs the user. Otherwise, the procedure is allowed to continue.

If there is no miscentering problem, the next step in the procedure is to spin the wheel/tire assembly to measure force variation and imbalance. The tire force variation is computed by removing from the measured wheel/tire assembly force variation a "compensated wheel rim runout" force variation contribution. The compensation includes any differences between the bead seat rim runout and the "outside" rim runout which were measured before tire mounting. This compensated rim runout is the runout that would be obtained from the bead seat method for the current wheel centering on the spindle of the balancer. Since the wheel/tire assembly force variation is also based on the current rim centering on the balancer, the highest accuracy tire force variation computation is achieved with this method.

Figure 5:
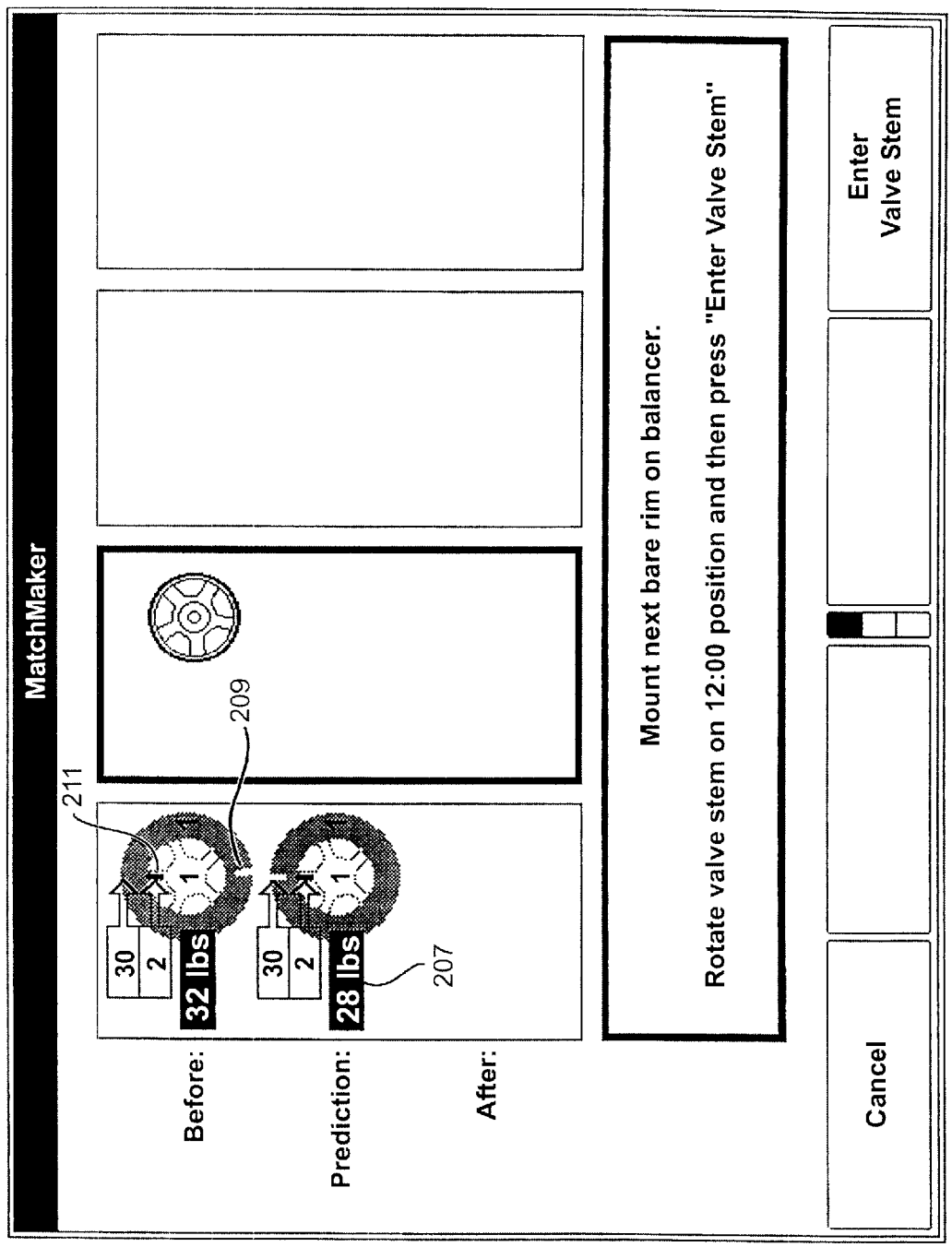

The tire force variation measurement of this assembly is automatically stored and displayed as reference tire #1 for later recall. The user is instructed via a screen (not shown) to mark the tire as "#1". Also, as shown in FIG. 5, the predicted matching result of rim #1 and tire #1 is displayed at 207. The user rotates the wheel/tire assembly to move the displayed tire matching mark 209 to the 12:00 position (as shown in FIG. 5). The user adds corresponding chalk marks (for example) to the tire when the correct position is reached. Then the user rotates the assembly again until the displayed wheel matching mark 211 is disposed at the 12:00 position. The wheel is suitably marked with this position (using chalk for example).

Figure 6A:
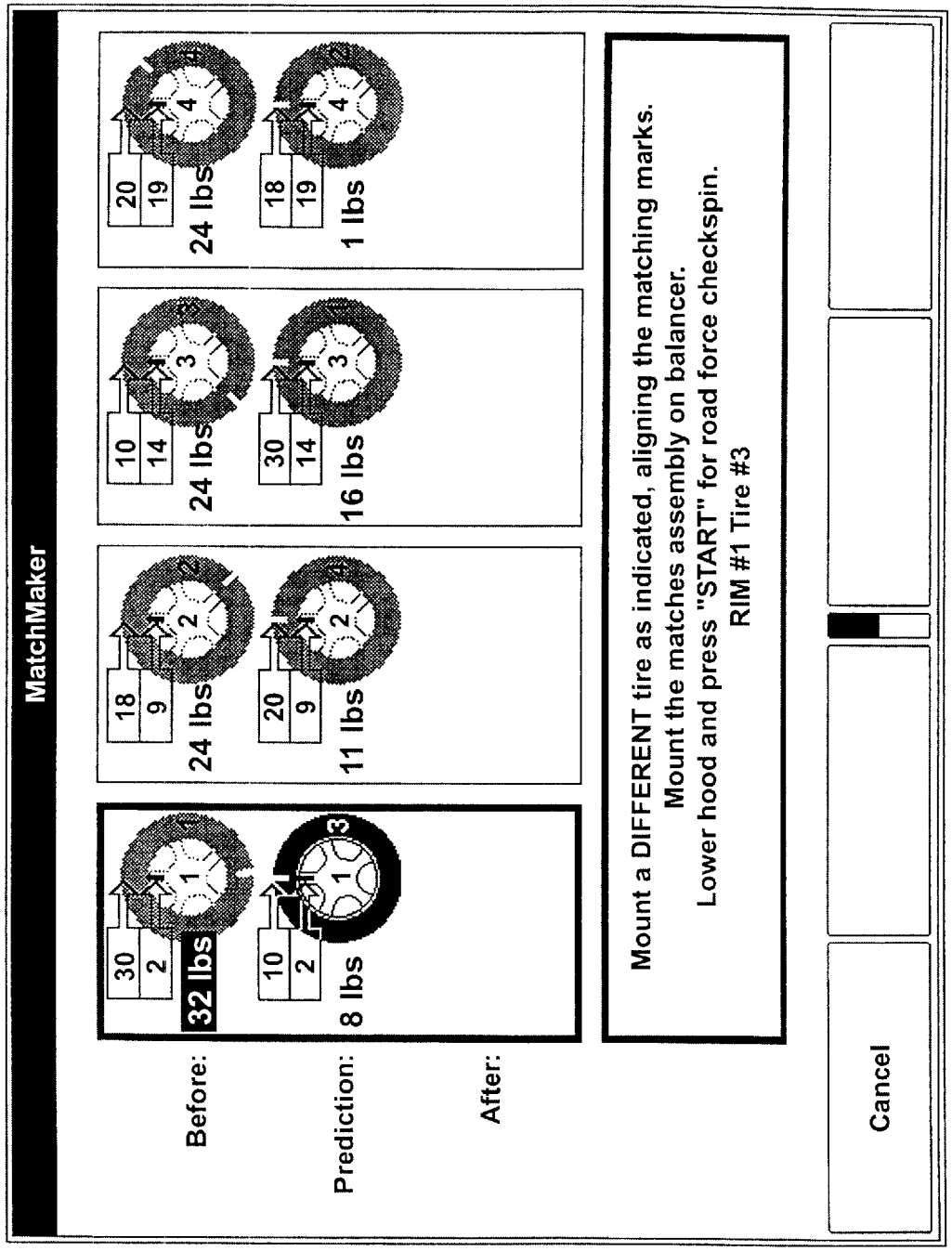

The assembly is removed from the balancer, but preferably no matching is attempted at this point in the procedure. Instead, the previous steps are repeated with another wheel and tire, with the components being marked with the next available number. As more assemblies are processed, the screen (see FIG. 6A) shows the best current match predictions for the available wheels and tires entered. For example, FIG. 6A shows the results at the fourth assembly force variation measurement step.

Figure 6B:
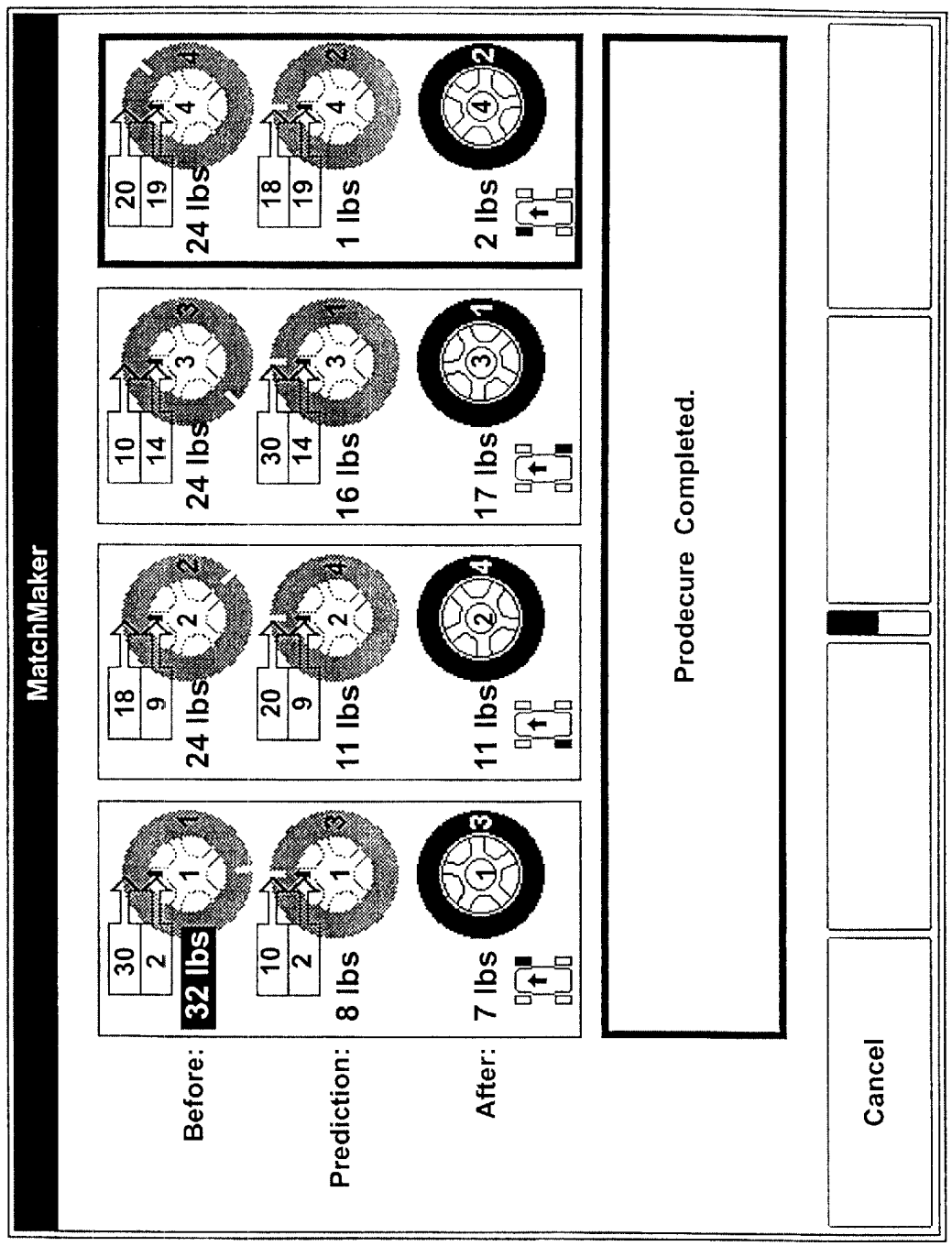

After all the assemblies are processed and the results are acceptable, matching is performed on them as illustrated on the screen. For example, FIG. 6A indicates that wheel #1 should be matched with tire #3, while tire #2 should be matched with wheel #4. If cross-matching is required, as with FIG. 6A, a printout of the matching instructions can be made for the user to carry to the tire changer. Preferably printouts are also made to record the imbalance and force variation for all assemblies (both original, and as matched) as shown on the screen illustrated in FIG. 6B.

After matching in accordance with the computer instructions, each numbered assembly is then balanced as guided by the screen.

Figure 7:
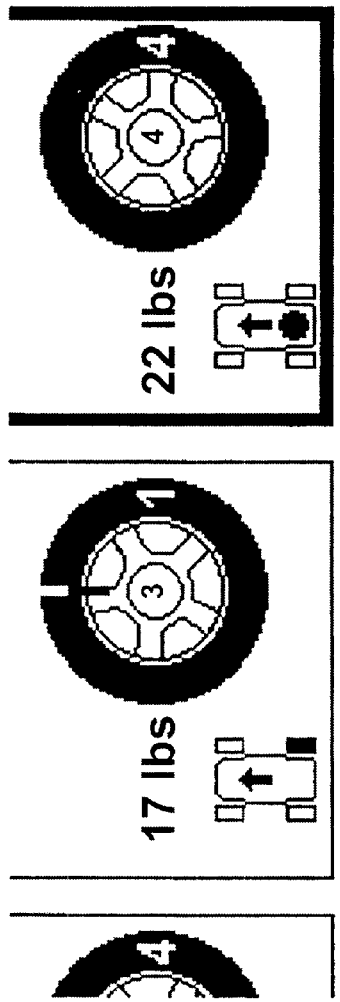
Figure 8:
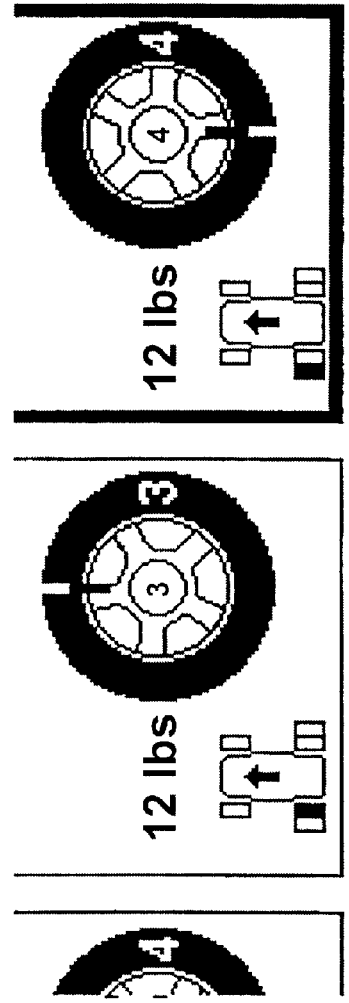

In matching, it is important to note that the tires are mounted to the respective wheels at the rotational locations indicated on the screen. Moreover, the assemblies are mounted on the vehicle at the recommended locations (as shown on FIG. 7). In addition, the matching marks are shown on the screen of FIG. 7 at a recommended orientation for placing the assembly onto the vehicle stud patterns. These recommended orientations take advantage of gravity and looseness of the fit of the wheel center bores to the vehicle wheel pilots, which induces a small amount of assembly runout which can counteract residual force variation and/or residual imbalance. The worst assemblies are mounted on the rear of the vehicle (which is the least sensitive end for vibration), as the spare location (see FIG. 7), or (optionally for "duallies") paired with another assembly with similar residual force variation but at opposing angular placement for net cancellation (see FIG. 8).

It should be understood that the method described above is directed by the CPU under program control, so that the balancer itself directs the performance of the method. It should also be understood that numerous options are available in performing the method. For example, at any time at measured tire can be "removed" from the procedure and replaced with a different tire. In this manner, the set of assemblies can be varied with the addition of different tires until a satisfactory result is achieved. Tires that are rejected for the particular wheels being tested can have match codes added to the angle mark discussed above and can then be re-inventoried for possible later use with other wheels.

It is also possible to provide a dual user function, so that matching being done by user A can be interrupted by a matching by user B, without interfering with the results obtained by user A.

It should also be appreciated that any time the left wheel rim lip is measured by arm 88 the outer arm 97 can also measure the runout of the right rim lip. This additional measurement provides more data for wheel remount centering compensation and error detection. This is especially important in cases where the wheel is mounted crooked, since the offset of most wheels causes the outer rim flange lateral and radial runout to be magnified compared to the inner runout change. Of course, one may prefer not to measure the right rim lip for various reasons, such as avoiding marring clearcoated aluminum wheels, or the fact that many wheels are "flat faced" or have spoke designs that prevent proper measurement of runout via the "outside" surfaces.

It should also be appreciated that the present invention does not require that the rim runout be determined prior to the runout of the wheel/tire assembly. For example, all four wheel/tire assemblies of a vehicle can be tested on the balancer, measuring only inner rim "outside runout" and assembly force variation. Each tire is then marked with a distinct number, corresponding to a number assigned to that wheel, with the mark being placed in line with the valve stem. Then, all four tires are dismounted, and the four bare wheels are sequentially mounted on the balancer (using the valve stem at 12:00 position as described above. The same runout measurements for the wheel rims are then obtained as described above, but in this option they are obtained last. Predictions are then made as in FIG. 6, with any required cross-matching shown. The tires are not remounted to the wheels at this point, however. Instead the displayed matching marks for the tires are added to the wheels with a "T" next to them. The user must lay the wheels on the tires, aligning the previous tire numbers to the rim valve stems for proper transfer of the "T" (tire) matching marks.

Another possible variation is to measure all common components at the same time. For instance, in the procedure described first above, it may not be desirable to measure a wheel rim, add a tire, measure the next wheel rim, etc. Rather, it may be preferred to measure all four wheels, then mount all four tires, and proceed with measuring the wheel/tire assemblies. This option could save time involved in walking back and forth to the tire changer.

In view of the above, it will be seen that all the objects and features of the present invention are achieved, and other advantageous results obtained. The description of the invention contained herein is illustrative only, and is not intended in a limiting sense.

What is claimed is:

1. A method of matching a tire to a wheel rim of a wheel, the wheel being a bare wheel prior to mounting the tire thereon, the method comprising:

mounting the bare wheel on a spindle of a wheel balancer;

determining the run-out of the wheel rim;

mounting a wheel/tire assembly on the balancer spindle, the wheel/tire assembly comprising the tire mounted on the bare wheel;

determining tire force variation of the wheel/tire assembly;

indicating to a user a relative rotational mounting position of the tire with respect to the wheel rim to minimize the tire force variation;

repeating the previous steps with at least one additional wheel and wheel/tire assembly;

calculating the force variations that would result from the mounting of each tested tire on each tested wheel;

matching the tested tires with the tested wheels so that force variation for each resulting wheel/tire assembly does not exceed a redetermined level.

2. The method as set forth in claim 1 further including providing to the balancer a signal indicative of the relative rotational position of the wheel rim with respect to the spindle.

3. A method of matching a tire to a wheel rim of a wheel, the wheel being referred to as a bare wheel prior to mounting the tire thereon, the method comprising:

mounting the bare wheel on a spindle of a wheel balancer;

determining the run-out of the wheel rim;

mounting a wheel/tire assembly on the balancer spindle, the wheel/tire assembly comprising the tire mounted on the bare wheel;

determining tire force variation of the wheel/tire assembly;

indicating a relative rotational mounting position of the tire with respect to the wheel rim to minimize the wheel/tire assembly force variation;

sequentially mounting a plurality of wheel/tire assemblies on the spindle;

measuring the force variations for each assembly;

marking each tire and wheel of each assembly to identify the tires and wheels;

sequentially mounting the wheels with tires removed on the spindle;

measuring the rim run-out for each wheel;

indicating to a user a preferred matching between the tires and the wheels to minimize assembly vibration, including an indication of relative rotational mounting positions of the tires with respect to the wheel rims.

4. The method as set forth in claim 3 further comprising the steps of:

measuring rim run-out from the exterior of the wheel to obtain a first rim run-out measurement;

measuring rim run-out from the bead seat to obtain a second rim run-out measurement;

measuring force variation of the wheel/tire assembly formed by mounting a tire on the wheel; and compensating the measured force variation for differences in the first and second rim run-out measurements.

5. The method as set forth in claim 3 further comprising the steps of:

measuring rim run-out when the wheel/tire assembly is mounted on the balancer spindle to determine another run-out of the wheel rim;

determining whether the rim run-out measurements differ by a predetermined amount indicating that the wheel was not centered properly on the spindle during one of the rim run-out measurements.

6. The method as set forth in claim 5 including the further step of compensating for the lack of centering if the rim run-out measurements differ by an amount less than the predetermined amount.

7. The method as set forth in claim 3 further including signaling to the balancer the rotational position of each wheel/tire assembly with respect to the spindle while the assembly is mounted on the spindle.

8. The method as set forth in claim 3 further including signaling to the balancer the rotational position of each wheel rim with respect to the spindle while the wheel is mounted on the spindle.

9. The method as set forth in claim 3 wherein the preferred matching includes matching tires to wheels in combinations other than that for which the assembly force variations were measured.

10. The method as set forth in claim 3 wherein the step of sequentially mounting a plurality of wheel/tire assemblies on the spindle is completed before the step of sequentially mounting the wheels with tires removed on the spindle is commenced.

11. The method as set forth in claim 3 wherein the step of sequentially mounting the wheels with tires removed on the spindle is completed before the step of sequentially mounting the plurality of wheel/tire assemblies on the spindle is commenced.

12. The method as set forth in claim 3 wherein at least four sets of tires and wheels are matched, further including indicating to the user to mount the two wheel/tire assemblies having the best tire force variation on the front of a vehicle.

13. The method as set forth in claim 3 wherein the run-out of the rim is measured on the exterior of the rim.

14. The method as set forth in claim 13 wherein the run-out of the rim is measured on the vehicle side rim flange.

15. The method as set forth in claim 13 wherein the run-out of the rim is measured on both the inner and outer rim flanges of the rim.

16. The method as set forth in claim 3 wherein the run-out of the rim is measured at the bead seats.

17. The method as set forth in claim 3 wherein the run-out of the rim is measured both at the bead seat and on the exterior of the rim.

18. The method as set forth in claim 17 wherein the tire force variation computation is compensated for differences between the measured rim run-out at the bead seat and the measured rim run-out measured on the exterior of the rim.

19. The method as set forth in claim 3 further including checking the centering of the wheel with respect to the spindle.

20. The method as set forth in claim 19 wherein the centering check includes remounting the wheel on the spindle and remeasuring rim run-out, any difference between the rim run-out measurements being indicative of a centering error.

21. The method as set forth in claim 3 wherein the rim run-out is measured on the exterior of the wheel rim, further including measuring the rim run-out for each wheel/tire assembly and signaling the possibility of a centering error if the wheel rim run-out measured on the exterior and the wheel/tire assembly rim run-out differ by more than a predetermined threshold amount.

22. The method as set forth in claim 21 including the further step of compensating for the lack of centering if the rim run-out measurements differ by an amount less than the predetermined amount.

23. The method as set forth in claim 3 wherein further including removing one of the marked tires from consideration and replacing it with an additional tire, repeating the steps of the method, and determining if the replacement tire results in better matching than the removed tire.

24. The method as set forth in claim 3 further including interrupting the method.

25. The method as set forth in claim 3 further including manually selecting a number of said wheel/tire assemblies.

26. The method as set forth in claim 3 further including indicating a preferred rotational mounting position of the wheel/tire assembly with respect to the vehicle wheel stud pattern.

27. A method of matching tires to wheel rims of wheels comprising:

mounting a bare wheel to a spindle of a wheel balancer;

measuring rim run-out of the wheel rim;

visually identifying the wheel whose rim run-out has been measured;

mounting a wheel/tire assembly to the spindle, the wheel/tire assembly comprising a tire mounted on the bare wheel;

measuring the force variation of the wheel/tire assembly;

compensating the measured force variation for the force variation due to rim run-out to determine force variation of the tire;

visually indicating to the user proposed matching locations on the tire and the wheel;

indicating the proposed matching locations on the tire and the wheel;

repeating the previous steps for any additional wheels and tires as desired to create a set of tires and wheels with proposed matching locations marked thereon;

automatically determining the best combinations between the tires and wheels that have been marked to reduce vibration;

mounting the tires on the wheels in the automatically determined best combinations.

28. The method as set forth in claim 27 further including signaling to the balancer the rotational position of the bare wheel with respect to the spindle.

29. The method as set forth in claim 27 further including signaling to the balancer the rotational position of the wheel/tire assembly with respect to the spindle.

30. The method as set forth in claim 27 wherein at least four sets of tires and wheels are matched, further including a visual indication to the user to mount the two wheel/tire assemblies having the best tire force variation on the front of a vehicle.

31. The method as set forth in claim 27 wherein the run-out of the rim is measured on the exterior of the rim.

32. The method as set forth in claim 31 wherein the run-out of the rim is measured on the vehicle side rim flange.

33. The method as set forth in claim 31 wherein the run-out of the rim is measured on both the inner and outer rim flanges of the rim.

34. The method as set forth in claim 27 wherein the run-out of the rim is measured at the bead seats.

35. The method as set forth in claim 27 wherein the run-out of the rim is measured both at the bead seat and on the exterior of the rim.

36. The method as set forth in claim 35 wherein the tire force variation computation is compensated for differences between the measured rim run-out at the bead seat and the measured rim run-out measured on the exterior of the rim.

37. The method as set forth in claim 27 further including checking the centering of the wheel with respect to the spindle.

38. The method as set forth in claim 37 wherein the centering check includes remounting the wheel on the spindle and remeasuring rim run-out, any difference between the rim run-out measurements being indicative of a centering error.

39. The method as set forth in claim 27 wherein the wheel rim run-out is measured on the exterior of the bare wheel, further including measuring the rim run-out of the wheel/tire assembly and signaling the possibility of a centering error if the wheel rim run-out measured on the exterior and the wheel/tire assembly rim run-out differ by more than a predetermined threshold amount.

40. The method as set forth in claim 39 including the further step of compensating for the lack of centering if the rim run-out measurements differ by an amount less than the predetermined amount.

41. The method as set forth in claim 23 wherein further including removing one of the marked tires from consideration and replacing it with an additional tire, repeating the steps of the method, and determining if the replacement tire results in better matching than the removed tire.

42. The method as set forth in claim 27 further including interrupting the method to do a procedure, said procedure being selected from the group consisting of measuring run-out on at least one wheel rim, measuring run-out on at least one wheel/tire assembly, measuring force variation on at least one wheel/tire assembly, balancing a wheel/tire assembly, removing one of the marked tires and replacing it with an additional tire; sequentially mounting another set of wheel/tire assemblies, matching at least one tire to at least one wheel rim, and performing a dual user function.

43. The method as set forth in claim 27 further including manually selecting at the beginning of the procedure the proposed number of wheel/tire assemblies to test.

44. The method as set forth in claim 27 further including indicating a preferred rotational mounting position of the wheel/tire assembly with respect to the vehicle wheel stud pattern.

45. The method as set forth in claim 27 further including repeating the steps until at least four sets of tires and wheels are matched, further including a visual indication to the user of the positions on the vehicle at which each of the four sets of tires and wheels should be mounted, and a visual indication to the user of the rotational position at which each tire should be mounted with respect to its matched wheel.

46. In an apparatus for matching tires to wheel rims of wheels, said apparatus including a balancer having a spindle on which wheels and wheel/tire assemblies may be mounted, said balancer determining and storing force variations and rim run-out, the improvement comprising:

a computer programmed to predict force variation for a given tire separately mounted on a plurality of different wheels, said wheels having said stored rim run-out.

47. The apparatus as set forth in claim 46 wherein said stored rim runout of the plurality of wheels is determined prior to taking any force variation measurements.

48. In an apparatus for matching tires to wheel rims of wheels, said apparatus including a balancer having a spindle on which wheels and wheel/tire assemblies may be mounted, said balancer determining and storing force variations and rim run-out, the improvement comprising:

a computer programmed to predict force variation for a given wheel having separately mounted thereon a plurality of different tires, said tires having said stored force variation.

49. The apparatus as set forth in claim 48 wherein said stored force variation for the plurality of tires is premeasured.

* * * * *